United States Patent [19]

Hornbostel, Jr.

[11] 4,055,844
[45] Oct. 25, 1977

[54] DETECTION SYSTEM

[75] Inventor: Lloyd H. Hornbostel, Jr., Beloit, Wis.

[73] Assignee: Beloit Management & Research Center, Beloit, Wis.

[21] Appl. No.: 462,456

[22] Filed: Apr. 19, 1974

Related U.S. Application Data

[63] Continuation-in-part of Ser. No. 368,609, June 11, 1973, abandoned.

[51] Int. Cl.$^2$ .............. G08B 19/00; A62C 37/24; A62C 37/02
[52] U.S. Cl. ................... 340/420; 340/214; 340/229; 340/240; 340/244 R; 340/418; 169/57; 137/557
[58] Field of Search ........... 340/214, 220, 229, 239 S, 340/240, 244 A, 244 B, 418, 420, 248 B, 249; 169/9, 57, 56, 60, 61, 42, 22, 20; 137/557, 72, 74; 116/65, 70, 103, 106

[56] References Cited

U.S. PATENT DOCUMENTS

| | | | |
|---|---|---|---|
| 583,405 | 5/1897 | Corbett | 340/240 |
| 1,557,250 | 10/1925 | Grandfield | 137/72 |
| 2,132,132 | 10/1938 | Seat | 340/239 S |
| 2,575,469 | 11/1951 | Rider | 169/22 |
| 2,591,959 | 4/1952 | McRae | 169/20 |
| 3,014,206 | 12/1961 | Slavin | 340/229 |
| 3,109,409 | 11/1963 | Demay | 340/229 |
| 3,119,368 | 1/1964 | Barnard | 340/229 |
| 3,220,206 | 11/1965 | Armentrout et al. | 340/248 B |
| 3,682,129 | 8/1972 | Philbrick | 116/65 |
| 3,772,671 | 11/1973 | Owen | 340/229 |
| 3,800,878 | 4/1974 | Poitras | 169/20 |
| 3,840,867 | 10/1974 | Welk, Jr. | 340/244 C |
| 3,876,011 | 4/1975 | Poitras | 169/57 |

*Primary Examiner*—John W. Caldwell
*Assistant Examiner*—Joseph E. Nowicki
*Attorney, Agent, or Firm*—Melvin F. Jager

[57] ABSTRACT

A static fluid system for detecting a selected change in an ambient condition. The system includes an elongate closed fluid line having a selected absolute fluid pressure and means to maintain the line pressure. Sensing means in the line respond to selected changes in ambient conditions to open the line and change the line to ambient pressure. Signal means responds to the change in line pressure, and flow restricting means in the line maintains the line pressure under normal ambient conditions and precludes re-establishment of the line pressure when the sensing means is activated to open the fluid line.

13 Claims, 22 Drawing Figures

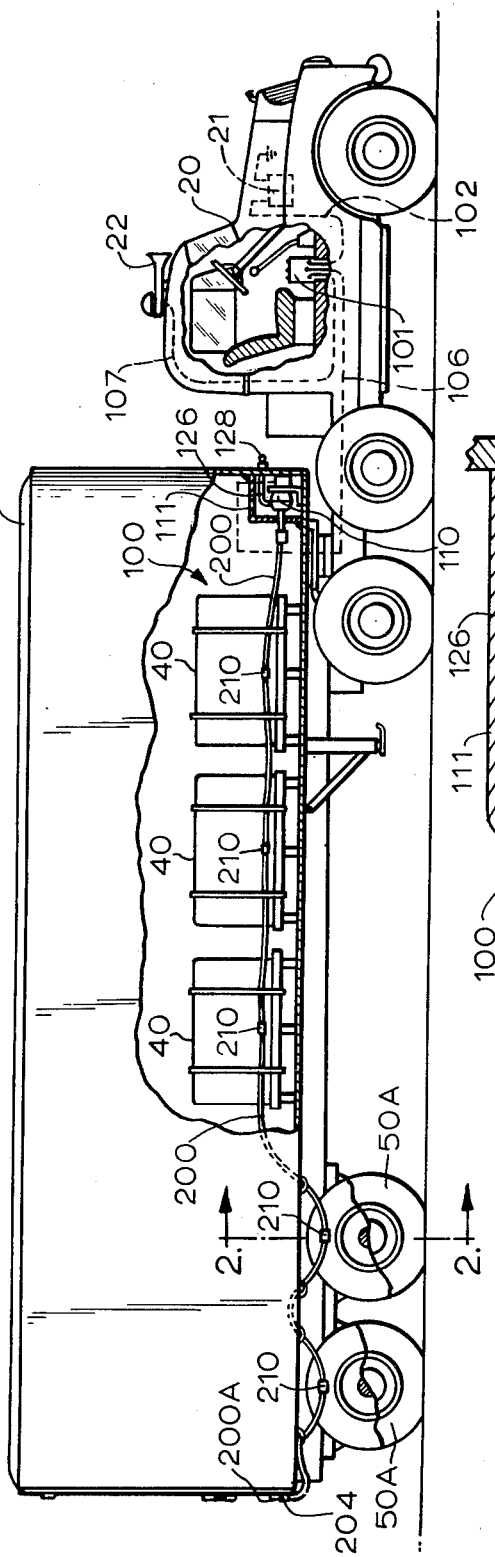
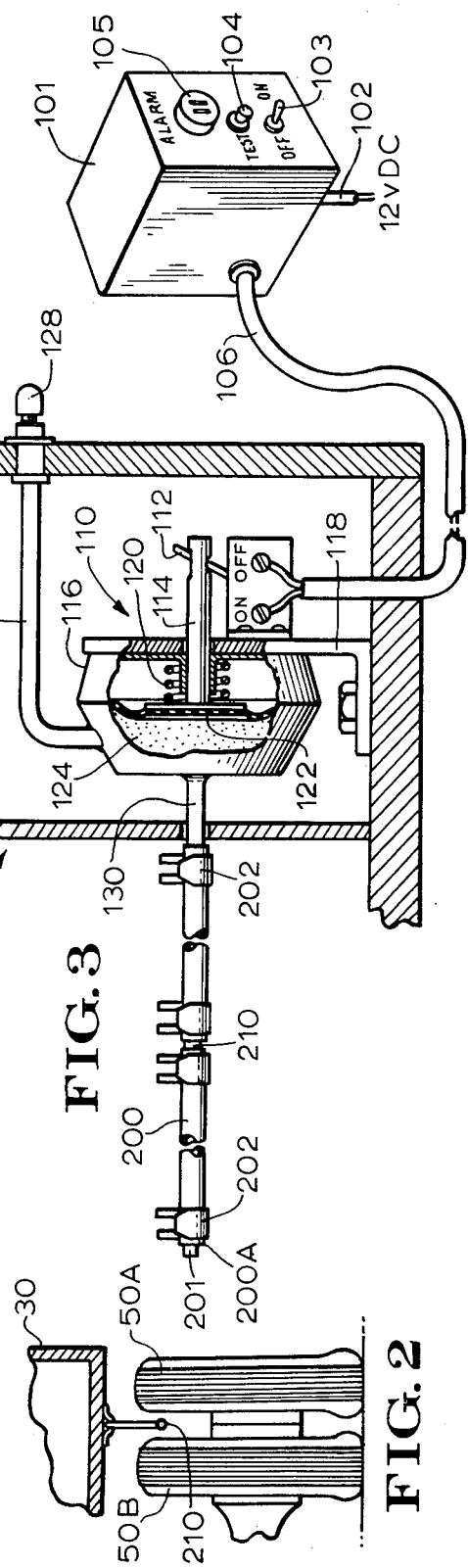

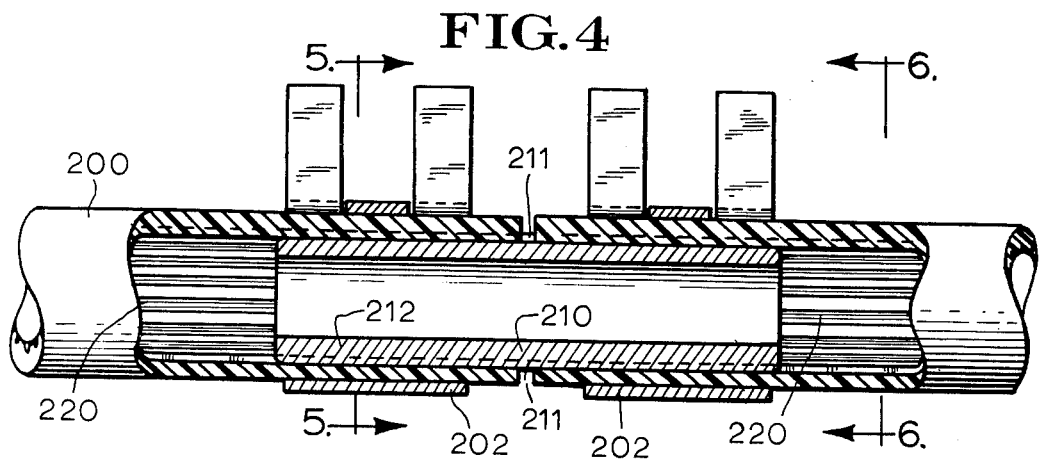
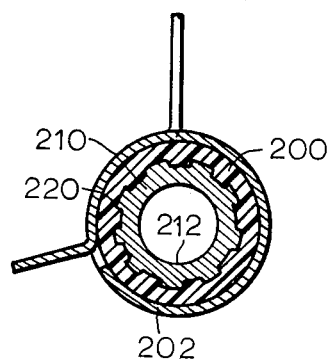
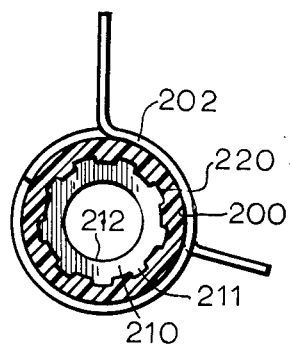
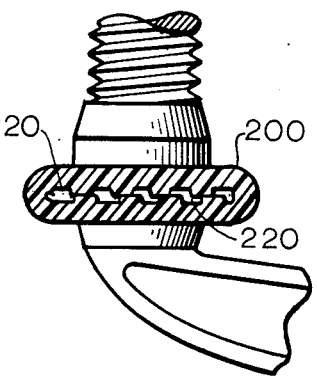
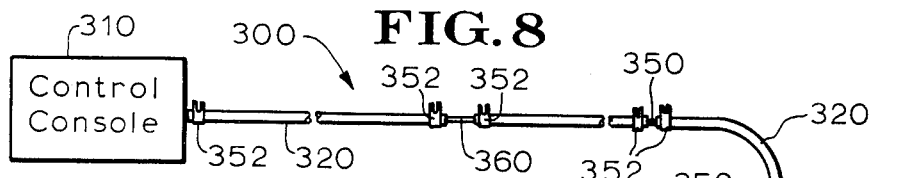
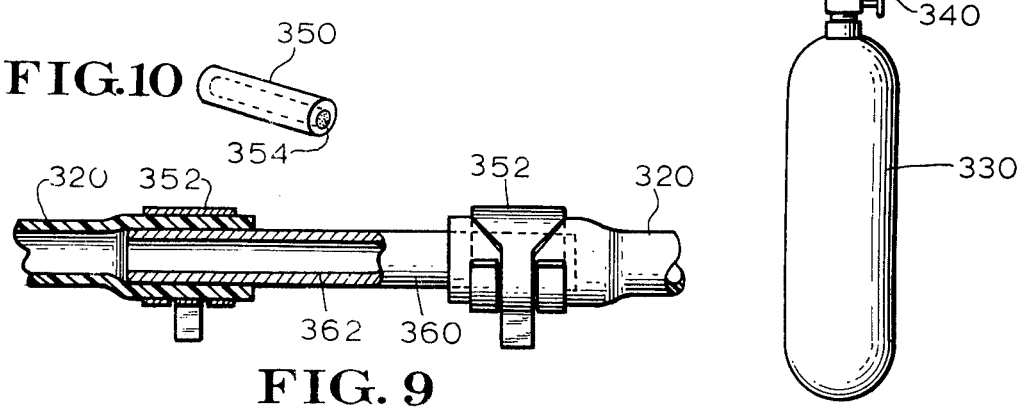

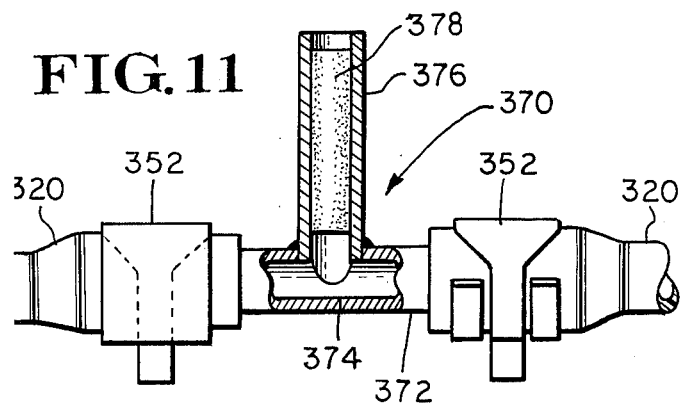
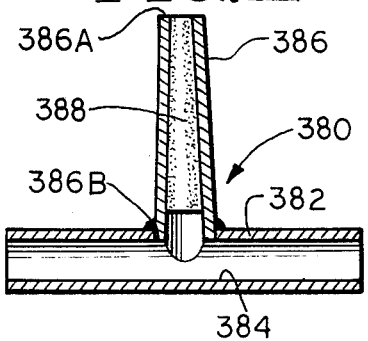
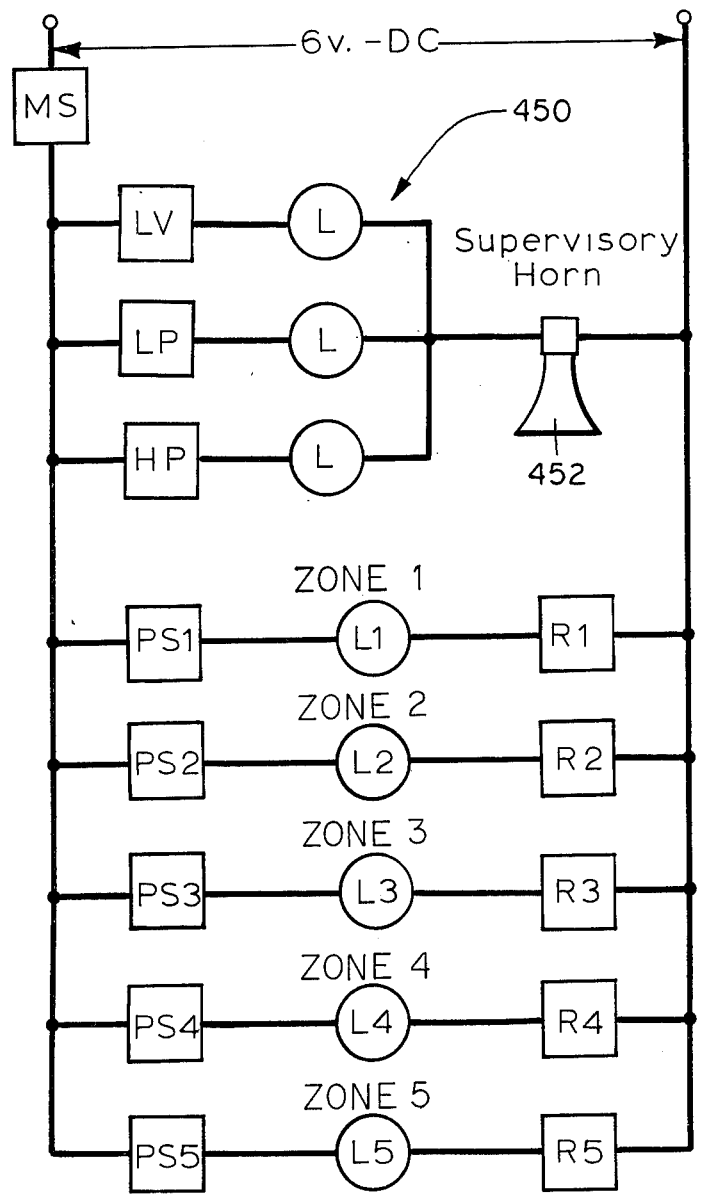
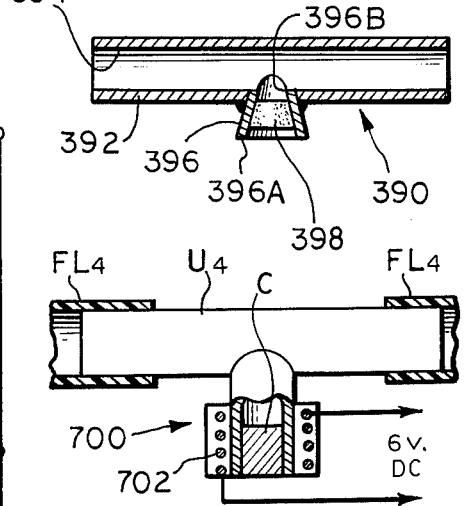
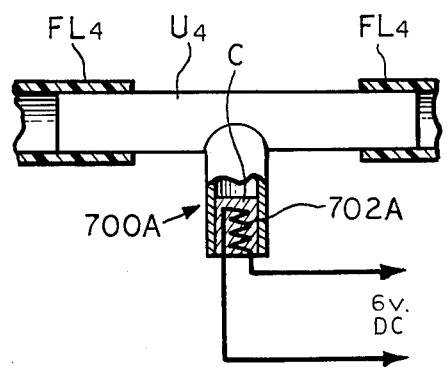

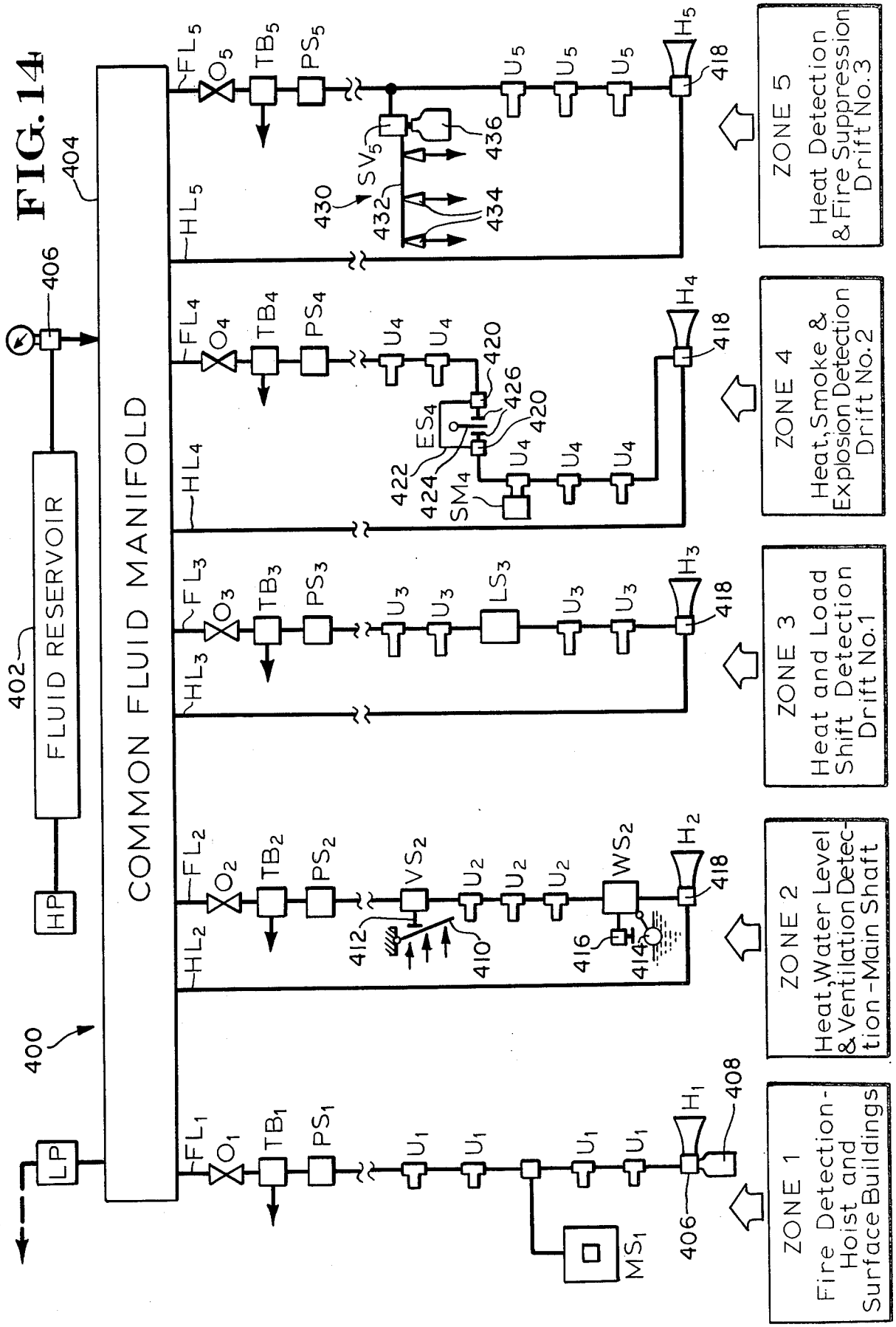

DETECTION SYSTEM

BACKGROUND AND GENERAL DESCRIPTION

This application is a continuation-in-part of my co-pending application, Ser. No. 368,609 filed June 11, 1973 entitled "DETECTION SYSTEM", now abandoned.

This invention relates to an improved system for detecting and responding to the existence of emergency conditions such as an undesirable shifting or attempted theft of products from truck beds, warehouses or the like; the occurence of a fire hazard, or the existence of critical conditions of mines, animal shelters, populated buildings and other confined areas, such as the presence of obnoxious or poisonous smoke or gases; a failure in the life-support ventilating system; vibrations or motions which signal dangers such as mine cave-ins or explosions, and the like.

There is a need for a simple and inexpensive detection system which will create a warning signal when an emergency condition exists, and which can be readily reactivated for further use after the emergency condition has passed. For instance, the customary shipment of products in open or accessible truck beds has created a substantial pilferage and theft problem. Even the largest equipment on a truck bed is subject to theft if the truck includes no detection system. Truck operators also constantly are subjected to the danger of shifting loads during transit.

In addition, there are many installations requiring a simple and fail-safe system for detecting the existence of undesirable changes in the ambient life-support conditions, such as heat build-up which would create a fire hazard, the presence of obnoxious or poisonous smoke or gas, failure of ventilating systems, vibrations and other motions signalling potential explosions or cave-ins, etc. Moreover, the system which detects and responds to emergency conditions should be essentially static and inert, so that the presence of the system does not create any substantial changes in the ambient environment being monitored and controlled.

For instance, the system should be non-electrical, so that no substantial electrical power supply is needed to maintain the system in operation. It has been found that the presence of electrical detection systems in many environments itself creates potential hazards. The presence of electrical energy is a detection system in dangerous and flammable areas, such as in mines and warehouses, creates the constant hazard of fire or explosion from an electrical malfunction of the system. Elaborate and expensive system components and procedures generally are needed to render electrical detection systems safe.

Prior attempts to avoid the problems presented by electrical detection systems have resulted in a variety of fluid systems, which also have deficiencies. Some existing fluid systems rely upon the dynamic flow of fluid which charges fluid into, and potentially changes, the ambient environment being monitored. Reliance is also placed upon highly sensitive pressure differentials which are intended to signal the existence of an emergency condition. The high sensitivity of such systems usually requires specialized and expensive fluid control components; maintenance to make the systems operative; and generally limits the flexibility and range of application of the systems.

Many prior designs further fail to allow a single integrated fluid detection system to independently monitor and respond to separate and distinct ambient condition changes within the same location or zone, or within a plurality of different zones. Such prior systems thus are unsuited for use in extensive applications; such as in mines and the like, where several distinct ambient life-support characeristics should be monitored simultaneously in the same zone, as well as in several zones, in a manner which allows a detection and a suitable response to a condition change in one zone, without deactivating or affecting otherwise the system in the other zones.

The combination of components in prior systems often presented additional problems concerning reliability. Generally, the design and arrangement of system components would not operate adequately to maintain the fluid system at the proper static pressure under normal conditions, while simultaneously assuring that the static pressure would not be re-established until the detected change in ambient conditions had passed. Prior fluid system components and arrangements, and the reliance on highly sensitive pressure differential detection, also has complicated the interfacing of the fluid detection system with secondary systems such as fire suppressant systems, which respond to the detected change in condition of the monitored environment.

Accordingly, the principle object of this invention is to provide a simple, economical and reliable detection system which will meet the above needs. Generally, the system comprises a fluid system which is static and inert, and thus does not add to or subtract from the monitored environment, under normal conditions. The fluid system is simple and inexpensive in design and operation, because the need for sensitive fluid components for detecting finite fluid pressure differentials is eliminated. In the present invention, operation is based upon the detection of relatively insensitive and non-critical differences between a selected positive or negative absolute pressure and the absolute ambient pressure of the monitored environment.

The selected absolute static pressure is maintained in a closed fluid line extended within the area or zone to be guarded and monitored for ambient condition changes. The line can be charged with a pressurized fluid such as nitrogen, comprised air, fire-suppressing gas or the like, or can be maintained at a negative gauge pressure by connection to a suitable vacuum system. One or more sensing means for detecting and responding to selected changes in ambient conditions is in fluid continuity with the line, and operate to change the absolute line pressure to the ambient pressure by opening the line to an initial fluid flow when the sensing means is activated by a selected change in ambient condition. Signaling indicia such as an audible or visual alarm is coupled to the line and responds to provide a signal when the line pressure is changed to the ambient pressure by activation of the sensing means.

The closed fluid line can be located in one or more zones to monitor conditions in several locations independently and simultaneously. Moreover, the sensing means are of special design to provide the desired response to a variety of ambient condition changes in the same or different zones. In one embodiment the sensing means disconnect from the line upon the application of a predetermined force to the line, and thereby detect undesired motion, such as load-shifting or tampering in trucks or storage warehouses, rock falls or cave-ins in mines, or the like. In another embodiment, the sensing means includes a fusible portion that opens the line in response to a selected rate and degree of change in the ambient temperature conditions. In other embodiments some of the sensing means may be adapted to open the fluid line in response to the presence of smoke or obnoxious and dangerous gases such as carbon monoxide; the presence of vibration energy; selected load-shifting of wall sections such as in mines; or other selected changes in the ambient conditions which are desired to be monitored.

The sensing means are readily replaceable or reset in the fluid line so that the pressure in the line can be re-established after the sensed ambient condition has passed.

In another aspect of this invention the fluid detection system includes a line charging or fluid supply means which performs multiple functions. The charging means includes a source of fluid under negative or positive absolute pressure which maintains the selected absolute static pressure in the line against the slight fluid leakage that may occur. The charging means also includes a flow restricting means coupled to the line between the fluid source and the sensing means in the line. The flow rate through the restricting means is selected to be substantially less than initial fluid flow through the sensing means when the sensing means is activated to open the line to ambient pressure. Thus, in accordance with this invention, the charging means prevents the re-establishment of the absolute pressure in the line from the fluid source when any sensing means has been activated.

The system is thereby rendered fail-safe, since the line cannot be returned to the selected line pressure, and the responding alarm signal stopped, until the activated sensing means is re-set or replaced after the sensed ambient condition has passed. The charging system also allows a plurality of lines in different zones to be connected to a common fluid source without affecting the independent operation of the lines in each zone. This feature is accomplished in this invention by connecting each line to the common source by a flow restricting means with a flow rate lower than the initial rate of the activated sensing means in any of the fluid lines. Thus, activation of a sensing means in one line cannot deplete the common fluid source or otherwise affect the continued supply of fluid to the other fluid lines.

The fluid detection system in accordance with this invention also is readily interfaced with supplemental detection and response systems which respond to condition changes other than the changes monitored by the sensing means in the fluid line, or which initiate remedial action to abate or retard the ambient condition changes detected by the line sensing means. For instance, the system can be interfaced with a supplemental system which detects ventilation failures or explosions in confined areas such as mines and animal shelters, and opens the connected fluid line to signal such conditions. Further, the fluid system can be interfaced with a response system, such as a fire suppressant system which charges fire suppressant or the like into the zone in which a fire hazard has been detected. The system is also readily adapted to a supplemental system which monitors the level of the fluid supply source.

More specifically, the alarm system in accordance with this invention includes an elongate pressure line preferably constructed from a flexible material such as polyethylene. The line has a central opening which is sealed in a fluid-tight condition, and is filled with a fluid to establish a selected absolute negative or positive line pressure. A pressure-responsive means such as a switch is included in the system and is maintained in an inactive position under normal ambient conditions. When an emergency condition occurs and the line pressure is changed to the ambient pressure surrounding the line, the switch responds to the pressure change by moving into an alarm position and thereby activating a suitable visual or audible alarm. A plurality of condition sensing means including a bore which maintains the fluid continuity of the line, are spaced at selected points along the line and means such as spring-biased retaining means apply a selected clamping force to the line adjacent the sensing means to seal the sensing means in the line. The sensing means respond to the application of a selected force to the line, or the existence of a predetermined temperature level or other selected ambient condition change, to break the seal of the line and thereby activate the alarm incorporated within the system.

Further features and advantages of the present invention will become more apparent from the following description of several embodiments thereof, taken in conjunction with the accompanying drawings, in which:

FIG. 1 is an elevational view of the detection system in accordance with this invention adapted to provide a warning system in the trailer truck;

FIG. 2 is a cross-sectional view taken along the line 2—2 of FIG. 1 illustrating the portion of the detection system arranged to signal the occurrence of a flat tire in a dual wheel assembly;

FIG. 3 is an enlarged and removed cross-sectional view of the control console embodied in the detection system illustrated in FIGS. 1 and 2;

FIG. 4 is an enlarged cross-sectional view of a break union incorporated at selected points within the warning system illustrated in FIGS. 1-3;

FIG. 5 is a cross-sectional view taken along the line 5—5 in FIG. 4;

FIG. 6 is a cross-sectional view taken along the line 6—6 in FIG. 4;

FIG. 7 is an enlarged schematic view illustrating the effects of compressing the flexible tubing included in the detection system in accordance with the present invention;

FIG. 8 is a schematic representation of a fire or ambient temperature change detection system in accordance with this invention;

FIG. 9 is an enlarged partial cross-sectional view of one embodiment of the fusible unions incorporated within the detection system illustrated in FIG. 8;

FIG. 10 represents a perspective view of one embodiment of a flow-restricting bleed orifice included in the detection system illustrated in FIG. 8;

FIG. 11 is an enlarged partial cross-sectional view of a second embodiment of a sensing union which may be incorporated in the detection system of this invention to respond to a selected change in ambient conditions such as a selected heat build-up or the like;

FIG. 12 is an enlarged cross-sectional view of a third embodiment of a sensing union for use in the detection system;

FIG. 13 is an enlarged cross-sectional view of a fourth embodiment of a sensing union adapted for use with a detection system energized by vacuum;

FIG. 14 is a schematic view of a multiple-zone, multiple condition sensing, detecting and monitoring system in accordance with this invention illustrated in use in an underground mine;

FIG. 15 is a schematic diagram of the central monitoring and control station for use with the mine installation illustrated in FIG. 14;

FIG. 17 is an enlarged partial cross-sectional view of a further embodiment of a sensing device for use in this invention in responding to selected motion such as fault shifting or the like;

FIG. 18 is an enlarged partial cross-sectional view of a still further embodiment of a sensing device for use in this invention for responding to a selected relative motion between two or more points such as caused by load shifting or fault separation in mines and the like;

FIG. 21 is a partial cross-sectional view of a sensing device for use in this invention adapted to detect smoke and the like; and FIG. 22 is a partial cross-sectional view of a modification of the sensing device shown in FIG. 21.

Figure 16:
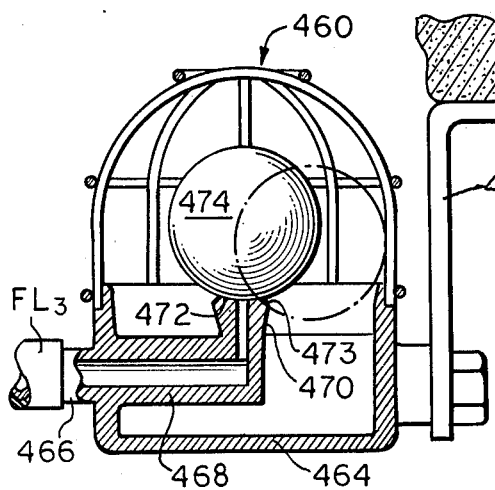
FIG. 16 is an enlarged partial cross-sectional view of another embodiment of a sensing device for use with this detection system for responding to selected motion or vibration such as in the shifting of mine faults, or motion in other vital support structures.

Referring generally to the drawings, FIGS. 1 through 6 illustrate the detection system in accodance with this invention adapted to be used in a trailer truck assembly to warn against unusual occurrences, such as load shifting, theft and tire blowouts. As seen in FIG. 1, the illustrated truck assembly includes a cab 20 and a trailer body 30. The load carried by the truck is represented by the loaded pallets 40 positioned within the truck body 30. Typical dual rear wheel assemblies for the truck body 30 are illustrated in FIGS. 1 and 2 by the dual wheels 50A and 50B. The truck cab 20 is also provided with a conventional horn 22.

The detection system in accordance with this invention is generally indicated by the reference numeral 100. As seen in FIG. 3, the system 100 includes an alarm console 101. The console 101 is connected to an energy source, such as the truck battery 21 (FIG. 1) by a suitable electrical connector 102. The console 101 includes an electrical off/on switch 103 for activating the system 100, and a press-on reset button 104 for testing and resetting the system 100, as explained further below. The console 101 further includes an alarm outlet connection 105. The connection 105 can be connected in any suitable manner to a warning system, such as the truck headlights or the horn 22, so that the warning system is activated when the detection system 100 is triggered. In the illustrated embodiment the connection 105 is electrically coupled to the truck horn 22 by the connector 107.

As indicated in FIG. 3, an electrical connector 106 joins the control console 101 to a dashpot and switch assembly 110. As seen in FIG. 1, the dashpot and switch assembly 100 preferaly is housed at a suitable location in the front of the body 30 within a protective housing 111. The housing 111 should be of strong construction to prevent thieves or vandals from tampering with the dashpot and switch assembly 110, and to prevent damage to the assembly 110 from shifting loads within the body 30.

As further seen in FIG. 3, the assembly 110 includes an electrical on/off switch 112 which is coupled to the electrical connection 106. The switch 112 also is mechanically coupled to the movable plunger 114 of a dashpot 116. The dashpot 116 is located within the housing 111 in a stationary position on a brace 118. The dashpot 116 includes a compression spring 120 which biases the plunger 114 in a selected direction (to the left in FIG. 3). The spring 120 in the illustrated embodiment constantly urges the plunger 114 into a position which retains the switch 112 in an "on" position. A flexible diaphragm 122 divides the interior of the dashpot 116, and defines a sealed fluid chamber 124.

As seen in FIG. 3, the sealed fluid chamber 124 is adapted to receive a fluid at a selected positive or negative guage pressure, for example, a pressurized fluid such as compressed air or nigrogen, from an external source. When the chamber 124 is subjected to a selected position guage pressure, a force is applied to the flexible diaphragm 122, and the diaphragm is urged in a set direction. In this embodiment the force of the pressurized fluid in the chamber 124 urges the diaphragm 122 to the right in FIG. 3 against the biasing force of the spring 120. The fluid pressure in the chamber 124 thereby urges the plunger 114 to the right in FIG. 3, and maintains the electrical switch 112 in the "off" position. The components and operation of the assembly 110 would be reversed if fluid under a negative gauge pressure or partial vacuum is used.

If the positive gauge pressure is diminished or removed from the chamber 124, the spring 120 will urge the diaphragm 122 and the plunger 114 to the right in FIG. 3, and thereby move the switch 112 from the "off" position to the "on" position. Such motion activates the electrical alarm console 101 when the control switch 103 is in the "on" position. The electrical circuitry in the console 101 than energizes a warning device, such as the horn 22.

The dashpot 116 also includes a charging line 126 in coupled relationship with the pressure chamber 124. As seen in FIG. 3, the line 126 extends through the casing 11, and preferably through the wall of the truck trailer 30. By this arrangement, the line 126 can be utilized to charge the chamber 124 with pressurized fluid, such as compressed air, from the exterior of the truck body 30. If compressed air is used as the pressurized fluid, the terminal end of the charging line 126 is provided with the usual air valve and cap assembly 128 to prevent leakage from the line 126 and the chamber 124. Compressed air is the preferred form of charging fluid for the detection system 100 because of the readily available supply of compressed air in the tires on the truck assembly. Thus, a small air hose (not shown) can be carried on the truck to charge the system 100 by bleeding air from a tire.

As indicated in FIG. 3, the detection system 100 in accordance with this invention also includes a fluid outlet coupling 130 connected to the dashpot 116. The coupling 130 is in fluid communication with the pressure chamber 124 in the dashpot and extends through the wall of the housing 111. The coupling 130 is adapted to receive the open end of a pressurized fluid detection line 200. The detection line 200 is formed from hollow flexible tubing, such as polyethylene. During the operation of the detection system 100, the interior of the line 200 is maintained charged at a fluid pressure substantially equal to the fluid pressure in the dashpot chamber 124. The line 200 has a free end 200A which is sealed with a fluid-tight plug 201. The opposite end of the line 200 is connected to the coupling 130, in a fluid-tight arrangement. The outside diameters for the plug 201 and the coupling 130 are selected to equal the inside diameter of the pressure line 200, within a close tolerance, so that the ends of the line 200 are sealed. In addition, the system 100 includes spring clips 202 which circumscribe the line 200 at the coupling 130 and the plug 201. The spring tension, diameter and area of the clips 202 are chosen to exert a selected uniform sealing pressure against the charged line 200, to thereby provide a fluid-tight seal between the line and the plug 201 and coupling 130. By this arrangement, the line 200 can be charged with a pressurized fluid, such as compressed air, and will be maintained at substantially the same pressure as contained in the dashpot pressure chamber 124. The line 200 and the dashpot chamber 124 are simultaneously charged with the compressed air through the inlet valve 128.

As seen in FIG. 1, the detection line 200 is adapted to be extended through the trailer body 30 in any desired arrangement. For example, after the truck body 30 is loaded, the detection line can be strung through the palletized loads 40, and suspended between the dual rear wheels 50A and 50B. The free end 200A of the line 200 is then secured at the rear of the truck body 30 by a clamp 204, or the like, in a manner which eliminates any substantial slack in the line.

In accordance with this invention, as seen in FIG. 1, the pressurized line 200 is provided with a plurality of break unions 210. The unions 210 are stationed at locations along the line 200 where movement of the line 200 is to be detected. The unions 210 are arranged to disconnect the line 200 when the line is subjected to a selected degree of movement, such as when the palletized loads 40 shift; when a thief attempts to remove the load; or when the line 200 is moved by occurrence of a blowout of one of the dual tires 50A or 50B.

When line 200 is fractured, the pressure in the line is relieved, and the pressure in the chamber 124 of the dashpot 110 is reduced. The spring 120 then will drive the plunger 114 to activate the alarm switch 112 from the "off" position to the "on" position. The control console 101 thereby triggers an alarm, such as the truck horn 22, to signal that the line 200 has been broken by some unusual occurrence.

The preferred arrangement for the line 200 and the break unions 210 is illustrated in FIGS. 4-7. The line 200 is extruded from a flexible plastic, such as polyethylene, in a manner which forms interior splines 220. As seen in FIG. 6, the splines 220 are uniformly spaced around the interior of the line 200 and extend the length of the line 200. The splines 220 prevent potential thieves or vandals from tampering with the line 200 in an attempt to overrule the alarm control console 101, such as by attempting to clamp the line 200 at a point upstream from any union 210, so that the breakage of the line at the union would not activate the alarm system. As shown in FIG. 7, the splines 220 preclude the line 200 from being sealed fluid-tight by compression from a clamping mechanism, since the splines cannot be sealed by compression of the flexible line. The line 200 will therefore continue to function by bleeding pressurized fluid from the line through the splines 220 upon the breakage of the line at any union 210.

As seen in FIGS. 4 and 5, each of the unions 210 comprises a metallic hollow cylinder having an outside diameter equal to the internal diameter of the line 200, within a close tolerance. Moreover, each union 210 is constructed from splined stock so that the splines 211 on the union are substantially identical in size and location to the splines 220 provided in the line 200. The unions 210 thus can be inserted at any point in the pressure line 200. The union splines 211 will also seal the splines 220 in the line against leakage at the break unions 210. The unions 210 further include a bore 212 which permits the passage of pressurized fluid through the unions.

As seen in FIG. 4, the break unions 220 are inserted into the free ends of aligned portions of the line 220. The compatability of the union splines 211 with the line splines 220 allows the unions to be inserted at any desired location along the length of the line 200. The spring clips 202 are placed on the line 200 adjacent each end of the unions 210 after the unions are inserted in the line. The spring tension, internal diameter and contact area of the clips 202 are co-ordinated with the diameters of the line 200 and unions 210 to apply a selected connecting pressure between the free ends of the line 200 and the union 210.

Generally, the clips 202 are dimensioned to seal the unions 210 into the line 200 in a fluid-tight arrangement, so that the pressurized fluid in the line 200 will not leak from the joints between the line 200 and the unions under normal conditions. However, the clips 202 will release the line 200 from the unions 210, by allowing the line to slide out of engagement with the unions, when the line is subjected to an unusual amount of force. The unusual force loads on the line 200 will be created by events such as a substantial shifting of the loads 40 in the truck body 30; an attempt by a thief or vandal to remove the loads 40 from the truck; or a blowout and collapse of the tires 50A or 50B against the line 200 suspended therebetween.

In the preferred arrangement of the detection system 100, the dashpot 110 is designed to be activated, and to move the switch 112 from an "off" to an "on" position, at a pressure of about 12 psi or less. A pressure in the line 200 and the chamber 124 greater than 12 psi will hold the switch 112 in the "off" position. Thus, the system 100 is energized by charging the chamber 124 and the line 200 with a fluid pressure of 25-30 psi. A pressure of 25-30 psi in the system 100 is preferred to overcharge the system and accomodate for any small loss of pressure resulting from minor leaks.

In accordance with this invention, this 25-30 psi charging pressure is readily available by connecting the charging valve 128 with the valve on any of the truck tires by means of a suitable air line (not shown). The compressed air in the tire, which is normally in the 25-30 psi range, will be bled into the line 200 and the chamber 124 to charge the system 100. The volumetric capacity of the system 100 is relatively small in a typical truck alarm installation, so that the charging of the system 100 from the truck tire will not materially deflate the tire.

In the preferred embodiment including a pressure of 25-30 psi in the system 100, the spring clips 202 are designed to allow the line 200 to part at the location of a break union 210 at a force load equivalent to a pressure of about 45-50 psi in the system 100. As described above, a break in the line 200, and the attendant loss of line pressure, will activate the dashpot 110 and the alarm console 101. After the emergency or the like has passed, the system 100 can be re-armed by reconnecting the separated break union 210 and recharging the system through the air pressure from a tire or other suitable source.

FIGS. 8, 9 and 10 illustrate a second embodiment of this invention adapted to detect fires or undesirable heat buildup, and to sound an appropriate alarm. The fire detection system 300 operates on the same basic principle as the above-described alarm system 100, in that the system 300 responds to the loss of air in a closed system. The system 300 includes a control console 310 designed to detect the loss of air in the system and respond by closing a suitable electrical relay (not shown) that has contacts normally held in an open position, and thereby trigger an alarm device. The preferred control console 310 includes a switch that is set to remain in an "off" or deactivated condition at about 20 psi, and is capable of being activated to an "on" position when the sensed pressure drops to 15 psi or lower. A suitable console switch that satisfies the above characteristics is currently marketed by Texas Instruments, Inc., under their trademark "KLIXON." The alarm device may be any audible or visual device, such as bells, lights, or a direct phone connection to a fire or police department switchboard. The console 310 should be located in an isolated area remote from any fire hazard and convenient to the connected alarm device. The electrical energy to activate the console 310 and the alarm device may be derived from the conventional AC power supply available at the location or from a self-contained battery system. The amount of energy consumed by the system 310 is minimal, since the system is activated only during testing or when a fire hazard has been detected.

As seen in FIG. 8, the control console 310 is coupled in fluid communication with the remote end of a closed flexible detection line 320. As described above, the line 320 is constructed from a suitable flexible plastic material, such as polyethylene. To install the system 300, the line 320 is strung throughout the room or plant or the like which is to be guarded against fire, and is secured in place by suitable fasteners which will not pinch or puncture the line. The coupling between the line 320 and the console 310 is accomplished through a pressure-sensitive dashpot, such as the dashpot 110 illustrated in FIG. 3, so that the console 310 is activated by a selected drop in pressure in the line 320. A spring clip 352, similar to the above-described clips 202, couples the line 320 to the control console 310 in a fluid-tight arrangement.

The line 320 can be charged with a pressurized fluid under positive gauge pressure, such as compressed air, by means of a compressor or the like, or can be charged with negative gauge pressure by connection to a vacuum source. However, in the preferred embodiment the fire detection system 300 includes a pressurized charging tank 330 joined to one end of the pressure line 320 with a spring clip 352. The tank 330 contains an inert fluid such as compressed air or nitrogen, under a selected pressure. Suitable gauges (not shown) can be provided on the tank 330 to indicate the pressure level in the detection system 300 and the residual pressure in the tank 330. A control valve 340 continuously connects the tank 330 to the detection line 320 and permits manual regulation of the flow of pressurized fluid from the tank into the line. The continuous connection of the line 320 to the tank 330 provides a constant source of pressurized fluid for the system 330 and thereby compensates for any minor fluid leaks which may develop in the system.

The system 330 also is provided with a bleed orifice 350 to control the rate of charging the line 320 from the tank 330. The bleed orifice 350 comprises a length of tubular stock which is positioned in the line 320 by means of spring clips 352. As seen in FIG. 10, the interior of the bleed orifice 350 is formed from a sintered metal core 354. The core 354 is designed to have a porosity which produces a selected rate of flow of the pressurized fluid from the tank 330 into the line 320. As explained further below, the bleed orifice 350 thereby restricts the amount of pressurized fluid re-entering the line 320 from the tank 330 after the system 300 has been activated by the detection of a fire hazard.

In order to detect the presence of a fire hazard, the system 300 in accordance with this invention includes a plurality a fusible melt unions 360. The unions 360 are inserted in the pressure line 320 at strategic points, such as in the line near electrical junction boxes or the like, where a potential fire hazard exists. As seen in FIG. 9, each of the unions 360 is cylindrical in configuration, and includes a hollow central bore 362 which allows the fluid in the line 320 to flow through the unions from the tank 330 to the control console 310. A pair of spring clips 352 secure the unions 360 in place within the free ends of a break in the pressure line 320. Moreover, a space is provided between the free ends of the line 320, as seen in FIG. 9, so that a substantial portion of the melt union 360 is exposed to the heat of the surrounding atmosphere. By this arrangement, a fire hazard which raises the temperature of the surrounding atmosphere to a selected degree will melt the adjacent union 360 and break the continuity of the pressure line 320. A drop in line pressure caused by such a line break will activate the control console and thereby trigger a fire alarm.

It has been found that the construction and installation of the melt unions 360 is crucial to the proper functioning of the alarm system 300. Each union 360 must melt and break the pressure line 320 when the temperature reaches a selected range. At the same time, each union 360 must include a bore 362 to maintain the continuity of the line 320, and must be installed in a substantially sealed relationship in the line 320. The unions 360 are preferably formed from a fusible metal such as RO-SE'S alloy, which melts at a temperature between 120° F and 180° F, in order to provide the proper response to hazardous fire conditions.

However, the softness and malleability of the union 360, necessary to produce the proper response to heat, create manufacturing and installation problems. For instance, normal drilling techniques to produce the bore 362 in each of the unions 360 create a temperature level that tends to melt the union 360 before the drilling is completed. It has been found that the bore 362 can be produced effectively if the melt union 360 is first chilled in liquid nitrogen for about 60 seconds. The nitrogen chilling stores enough heat sink capability in the union 360 to allow the drilling of the bores 362 to be completed without melting or distorting the union.

In addition, the softness of the metal alloy unions 360 creates problems in securing the unions in a sealed relationship in the pressure line 320. Conventional clamping techniques to join the line 320 to the unions 360 created a pressure which elongated or deformed the unions, and threatened to restrict the flow through the union bore 362 and to cause pressure leaks at the juncture between the unions and the line 320. It has been found that the deformation of the unions 360 can be eliminated, and a tight seal maintained between the union and the line 320, by proper co-ordination of the tension and size of the spring clips 352, the relative size of the line 320 and unions 360 and the pressure in the line 320. For instance, the preferred dimensions for the line 320 are about 3/16 inches in internal diameter and 5/16 inches in external diameter. The melt union 360 is preferably ¼ inch in exernal diameter, and the bore 362 is ⅛ inch. The melt unions 360 are inserted into the line 320, with the aid of a suitable lubricant, and thereby stretch the internal diameter of the line 320 by 1/16 of an inch. The stretching of the line 320 creates a uniform compression force on the engaged ends of the unions 360 that is sufficient to seal the juncture from pressure leaks but not sufficient to deform the unions. In addition, the preferred pressure in the line 320 is about 25 psi, and the spring clips 352 are preferably designed to apply a tension or clamping force of about 12 psi at about ⅜ of an inch in diameter. This arrangement produces a holding force which will secure the unions 360 in the line 320 against leaks and will maintain the shape of the unions.

The design of the system 300 in accordance with this invention also allows the response characteristics of the unions 360 to be varied within a selected range by varying the diameter of the bores 362. For instance, if the union 360 is located in a critical area, such as an electrical junction box, where a rise in temperature is an immediate indication of a fire hazard, the bore 362 in the union can be enlarged. A relatively large bore 362 in the union 360 will decrease the size of the wall section forming the union, and will thereby make the union more sensitive to heat. Similarly, a smaller diameter for the bore 362 would be sufficient to provide the necessary response time if the union 360 is located at a high heat source, such as adjacent an oven in an industrial kitchen.

The installation of the fire detection system 300 is begun by determining the location for the heat-sensitive melt unions 360 needed to provide maximum protection against fire hazards. The control console 310 is located in a remote area away from any fire hazard, and convenient to the connected alarm system. One free end of the pressure line 320 is then coupled to the pressure-senstive switch (e.g., dashpot 110) provided in the console 310. The remainder of the line 320 is strung in a continuous fashion through the locations where the melt unions 360 are to be located. The line 320 may be secured in place by any suitable hook or fastener that does not crimp or puncture the line. The connections can also be added to the line 320 if needed to reach hazardous areas. The melt unions 360 are added to the line 320 before the line is finally secured in place.

The unions 360 are added to the line 320 by severing the line at the desired union location and sliding the two spring clips 352 over the free ends of the line. The union 360 is then pressed into the open ends of the line 320. As explained above, the union is approximately 1/16 inch larger than the internal diameter of the line 320 so that the line is in tight sealing engagement with the union 360. As seen in FIG. 9, the union 360 is set in the line 320 so that a substantial portion of the union is exposed to the heat of the surrounding atmosphere. In a typical installation with 1 inch unions, ¼ inch to ⅜ inch of the union should be exposed, with the ends of the union projecting an equal amount into the line 320. The spring clips 352 are then clamped over the line 320 and the ends of the union 360 to secure the union in place, and to assure a fluid-tight seal. This procedure is repeated for each union 360.

After the unions 360 are inserted in the line 320 at the needed locations, the line is charged with a pressurized fluid, such as compressed air or nitrogen, to a pressure preferably in the range 20-25 psi. To accomplish this charging in the illustrated embodiment, the free end of the line 320 is coupled to the bleed orifice 350. As described above, the orifice 350 includes a core 354 of porous sintered metal which restricts the area through which pressurized fluid will flow into the line 320 down to 0.5% to 1.0% of the original line flow area. The orifice 350 thereby provides the system 300 with a substantially reduced recharging rate, and permits the system to be continuously coupled to the charging tank 330 through the bleed orifice. The tank 330 thus continuously applies pressure to the line 320 and compensates for any loss of line pressure through minor leakage in the system 300. The restricted area of the bleed orifice 350 prevents the pressure in the tank 330 from rapidly recharging the line 320 after a break in the line at a union 360 has signaled the existence of a fire hazard. Since the area of the orifice 350 is approximately 1% of the area of the line 320, any break at the melt unions 360 will deplete the line 320 at a flow rate which exceeds the recharge rate of flow from the tank 330 through the orifice 350.

FIG. 11 illustrates an alternative form of union 370 for use in the detection system of this invention. The union 370 has a generally T-shaped configuration, and has a base portion 372 emplaced within the fluid line 320 (see FIG. 8) in a fluid-tight relationship by suitable fastening means such as the above-described spring clips 352.

The T-shaped union 370 is particularly suited for use in the type of system shown in FIGS. 8-10 for sensing and responding to ambient temperature changes. Due to its configuration and operation, the body portion of the union 370 can be constructed from a material with a high melting temperature and with relatively high tensile strength, such as steel or copper tubing and the union can be re-used. The use of a non-fusible and strong material eliminates extrusion of the union material from the continuous pressure of the spring clips 352 and thereby assists in maintaining a fluid-tight joint with the line 320.

The configuration of the union 370 also provides improved fluid flow characteristics. Since the response of the union to ambient temperature changes does not depend upon the union wall thickness or material flow, the base portion 372 of the union can exclude an enlarged bore 374 having an internal diameter equal to or larger than the internal diameter of the fluid line 320. The bore 374 thus allows unrestricted flow of the line fluid through the union 370, without any substantial affect on the line pressure. Even a slight fluid pressure drop through each union 370 would have an accumulative effect, since the line 320 may include a substantial number of unions. The outer diameter of the base portion 372 is larger than the internal diameter of the line 320, so the line 320 is secured to the union 370 by tight friction fit caused by the expansion of the line 320 over the union base portion 374.

The union 370 also includes a core portion 376 connected and extending outwardly from the base portion 372. The internal diameter of the core portion is preferably equal to the diameter of the bore 374 to equalize the fluid pressure within the union. In accordance with this invention, the length of the core portion 376 is substantial in relation to the base portion 372, and is designed to receive a removable core 378. The core 378 is made from a material selected to respond to a designated change in ambient conditions. In the typical case, the core 378 would be a fusible material such as Rose's Metal, wax or the like with a selected melting point below the melting point of the union 370. In other instances the core 378 could be a thixotropic material adapted to respond to physical vibrations, or a material such as Hopcalite which responds in the presence of a selected chemical agent such as carbon monoxide.

In the construction or re-assembly of the union 376 the core 378 is added to the core portion 376 in a molten or soft state, or is heated after insulation therein, to form a temporary bond between the core material and the inside walls of the core portion. With the core 378 in place, the union 370 is prepared to respond to a selected ambient condition change. The selected condition change melts or otherwise changes the state of the material of the core 378 forming the bond with the core portion 376. The line pressure inside the union 370 will then eject the core 378 outwardly from the core portion 378.

The ejection of the core 378 opens the line 370 and changes the line pressure to ambient pressure to signal the condition change.

The design of the union 370 allows the union to respond to a particular quantitative ambient condition change, and further allows the rate of response to be controlled. For instance, if the union 370 is designed to be responsive to a temperature, the core material as chosen to respond by melting in the areas of contact with the core portion 376 at the selected threshhold temperature. The core length is designed to control the response rate. If a rapid response is desired, the core 378 is provided with a short length. If a prolonged response is desired the core 378 is provided with a substantial length, as shown in FIG. 11. If the short core 378 is used, a change to the threshhold temperature will quickly melt the core sufficiently to cause the line pressure to eject the core and signal the condition change. If a long core 378 is used, the union 370 can withstand transient rises to the threshhold temperature without ejecting the core, since a longer time is needed to melt the longer core sufficiently for ejection. The core length can also be varied to provide a response time between the extreme conditions.

The core 378 also can be formed from a low-melting point material such as wax or the like, so that the core 378 can respond to relatively low threshhold temperatures in the life sustaining range. The lower response temperature is possible since the design of the union 370 does not require a high tensile strength core 378 to maintain the structural stability of the union.

FIG. 12 illustrates a second embodiment of a generally T-shaped union 380 for use in the system of this invention. The union 380 includes a base portion 382 with an enlarged bore 384, as in the union 370. The base portion 382 is inserted within the line 320 as shown in FIG. 11. The union 380 differs from the union 370 in having a tapered core portion 386 for receiving the removable core 388. As seen in FIG. 12, the tapered core portion 386 is frusto-conical in configuration, so that the outer end 386A has an internal diameter less than the internal diameter of the inner end 386B. The core 388 formed in the core portion 386 assumes the same frusto-conical configuration.

The union 380 operates in essentially the same manner as described above with respect to the union 370. However, the tapered configuration of the core portion 386 changes the rate-of-response characteristics of the union. Since the diameter 386A is reduced, the core 388 cannot be ejected from the union 380 when the bond between the core and the core portion 386 is broken by a temperature rise or the like. In the union 380 the side portions of the core 388 must melt or change state to reduce the core to the size of the diameter of the union end portion 386A before ejection can take place. The union 380 therefore has a substantially prolonged response time when compared to the union 370. The union 380 is thus suitable for use in installations where the rate of change of the ambient condition is a significant factor to be monitored and controlled.

FIG. 13 illustrates a further embodiment of a union 390 that is particularly adapted for use with a detection system energized by a partial vacuum in the fluid line 320. The base portion 392 with an enlarged bore 394 is designed for connection to the line 320. The core portion 396 is frusto-conical in configuration, and the inserted core 398 assumes the same shape. The core portion 396 is reversed from the core portion 386 shown in FIG. 12, with the inner end 396B having a smaller internal diameter than the outer end 396A. Since the base portion 396 is under vacuum, the core 398 will be ejected inwardly by the higher ambient pressure when the core responds to a condition change. As in the union 380, the tapered walls of the core portion 396 prolong the response time of the union 390.

FIG. 14 illustrates a multiple zone and multiple condition sensing and control system 400, in accordance with this invention. For purposes of illustration, the system 400 is displayed as a comprehensive system for sensing and controlling the life-support conditions of a mine. The system is equally adaptable for use in other environments, such as factories, warehouses, animal shelters, vehicles or dwellings and the like, to sense an ambient condition change that is harmful or undesirable.

The illustrated system 400 uses compressed air as the working fluid, although it is understood that other and inert fluids such as nitrogen, or vacuum pressure, can be used as the working fluid. In FIG. 14 a constant supply of compressed air is available to the system 400 from the fluid reservoir 402. The pressure within the reservoir 402 is a relatively high pressure. For example 90–125 psi (gauge), and is remotely monitored by a high pressure gauge H.P. The fluid reservoir 402 is in continuous fluid contact with a common fluid manifold 404 through a pressure regulator valve 406. The manifold 404 is maintained at a selected lower pressure, such as 25-30 psi (gauge), which is remotely monitored by a lower pressure gauge L.P. The manifold 404 thereby provides a constant supply of fluid at a selected pressure to each operating zone of the multi-zone system 400.

For purposes of illustration, the system 400 includes five zones for monitoring and controlling a plurality of ambient conditions in five separate areas of the mine. The zone 1 system is connected to the common manifold 404 by the fluid pressure line FL1, and is arranged to detect a fire hazard in the hoist and surface buildings. The Zone 2 system is connected to the manifold 404 by the fluid pressure line FL2, and is adapted to monitor the heat level, water level and ventilation characteristics of the main mine shaft. The zone 3 system is joined to the manifold 404 by the fluid line FL3 and monitors the heat level and load or wall shifting in mine drift No. 1. The zone 4 system is connected to the manifold 404 by the fluid line FL4, and is adapted to detect heat level changes and explosion conditions in mine Drift No. 2. The zone 5 system is connected to the common manifold 404 by the fluid line FL5, and is designated to detect and suppress fire hazards in mine drift No. 3.

The particular arrangement of the zones, and the components within each zone, is shown in FIG. 14 for purposes of illustration. The various detecting and monitoring devices in the system 400 can be inter-mixed and re-arranged to suit the special needs of any particular field installation. Regardless of the mix of sensing components within each zone, the zones are connected to the common manifold 404 in a manner which isolates the zones from each other, so that the activation of one zone does not affect the continued operation of any of the remaining zones. This important operating characteristic is accomplished by connecting each fluid line (FL1-5) to the common manifold 404 through a restricted orifice (01-5). As described above, the orifices 01-5 substantially restrict the fluid flow from the manifold 404 into each line FL1-5 to a flow of, for example 0.5% to 1.0% of the unrestricted flow. The orifices 01-5 are coordinated with the initial flow through any of the sensing means in the fluid line for the zone (e.g., sensing unions U1, U2 etc.) so that the constant fluid flow into the zone line from the manifold 404 through the associated orifice is substantially less than the initial flow through an activated sensing means in the line.

The restricted orifices 01-5 thereby prevent each zone from being re-charged with fluid after a monitored ambient condition change has occured. Further, the orifices 01-5 isolate the zones by preventing the activation of one zone from depleting the pressure in the common manifold 404 to the extent of affecting the continued operation of the other zones. The non-activated zone lines will remain essentially at the manifold pressure of about 25-30 psi, and will continue to perform their monitoring and control functions. As shown in FIG. 14, each fluid line FL1-5 is provided with a pressure test button (TB1-5) within the zone. Manual activation of the test button temporarily opens the associated fluid line to ambient pressure and activates the associated horn (H1-5) or other signal, to allow a periodic test of the continued functioning of each zone system. Each fluid line FL1-5 also includes a pressure switch (PS1-5) which monitors the line pressure and sends an appropriate signal to a remote supervisory control board.

The fluid line $FL_1$ for Zone No. 1 can be any desired length to suit the field requirements, and is made from flexible tubing such as described above for the line 320. A plurality of temperature-responsive melt unions $U_1$ are placed within the line $FL_1$ at locations along the length of the line where as potential fire hazard exists. In the preferred arrangement the unions $U_1$ are T-shaped unions, as described above with respect to FIGS. 11 and 12, with an enlarged bore which does not minimize the pressure loss across the unions. The number of unions U, in the line $FL_1$ thus will not detract from the operation of the zone system or limit the length of the pressure line.

For illustrative purposes, the zone No. 1 system is shown as including a break-glass type switch $MS_1$ within the zone of operation. The switch $MS_1$ can be operated manually to open the line $FL_1$ to ambient pressure and activate the system. Such a switch can be incorporated into each zone, if desired. Zone No. 1 also includes a self-contained horn $H_1$ to create an audible signal in the zone when the zone system is activated by the opening of the test button $TB_1$, the switch $MS_1$ or any of the unions $U_1$. The horn H is connected to the line $FL_2$ by a pressure valve 406 of standard construction, and includes a canister 408 of pressurized fluid such as $CO_2$. The canister is interfaced with the horn $H_1$ through the valve 406. The pressure in the line $FL_1$ holds valve 406 normally closed. When the line pressure changes to ambient upon activation of the zone system, the valve 406 opens the canister 408 to the horn H.

Zone No. 2 illustrates further combinations of monitoring and control devices which can be included within a zone detection system in accordance with this invention. Zone No. 2 includes a plurality of melt unions $U_2$ as described above with respect to FIGS. 11 and 12, to monitor selected ambient temperature changes within the zone. Since Zone No. 2 represents the main mine shaft where proper ventilation is crucial during emergency conditions, this zone system includes a ventilation switch $VS_2$ for monitoring the air flow in the zone.

As schematically illustrated in FIG. 14, the ventilation switch $VS_2$ is a normally-closed spring-loaded pressure switch of standard construction emplaced within the zone line $FL_2$. The switch $VS_2$ is interfaced with an air flow sensor 410 through a connecting link 412. The sensor 410 is located within the ventilation air stream of zone No. 2 and engages link 412 to maintain valve $VS_2$ closed under normal air-flow conditions. If a ventilation system failure occurs, the sensor 410 will detect the condition change and activate the valve $VS_2$ through the link 412. The valve $VS_2$ then opens the line $FL_2$ to ambient pressure and activates the zone system to signal a ventilation hazard.

The zone No. 2 system also includes a water level switch $WS_2$ to monitor for flooding conditions in the main mine shaft. The switch $WS_2$ is a normally-closed spring-loaded pressure switch incorporated within the fluid line $FL_2$. A water-level float sensor 414 of standard construction is interfaced with the switch $WS_2$ through a pressure link 416. If the water level in the main shaft reaches a pre-determined level, the float 414 will open the valve $WS_2$ through the link 416. The opening of the valve $WS_2$ will activate the zone system by changing the pressure in line $FL_2$ to ambient pressure.

The zone No. 2 system includes a modified arrangement for the zone signal horn H2. A pressure valve 418 connects the horn $H_2$ to the detection line $FL_2$ and also to a separate parallel horn line $HL_2$ leading from the manifold 404. The switch 418 is arranged so that the pressure in the line $FL_2$ will block fluid flow from the horn line $HL_2$ to the horn $H_2$ under normal ambient conditions. When the pressure in line $FL_2$ is changed to ambient pressure by activation of the unions $U_2$, the test button $TB_2$ or the switch $WS_2$, the switch 418 connects horn $H_2$ to the horn line $HL_2$ to annunciate an audible signal in the zone.

The Zone No. 3 system shown in FIG. 14 is adapted to monitor the ambient conditions within mine drift No. 1. Selected rises in ambient temperature, and rates or rise, are monitored in critical locations by a plurality of melt unions $U_3$ placed in the line $FL_3$. As in the other zone systems, the unions $U_3$ are preferably constructed as described above with respect to FIGS. 11 and 12. Zone 3 includes a signal horn $H_3$ which is coupled to the parallel horn line HL and line $FL_3$ by a pressure valve 418, as described above with respect to zone No. 2.

The Zone No. 3 system further includes a load shift detection switch $LS_3$. As set forth in detail in reference to FIGS. 16-18, the switch $LS_3$ functions to activate the zone 3 system in response to a selected shift in the supporting structure in mine drift No. 1, such as a fault shift or a wall shift which signals the potential of a rock slide or mine cave-in. Generally, the selected motion causes the normally-closed switch $LS_3$ to open and change the pressure in line $FL_3$ to ambient pressure, to thereby activate the horn $H_3$ and other emergency signals.

The Zone No. 4 system is also designed to monitor changes in ambient temperature conditions by means of a plurality of melt unions $U_4$ such as shown in FIGS. 11 and 12, in the line $FL_4$. As shown in zones 2 and 3, zone 4 also incorporates a signal horn $H_4$ connected to the parallel fluid lines $HL_4$ and $FL_4$ by the above-described pressure valve 418. The line $FL_4$ also includes an explosion detection switch $ES_4$ for activating the zone system in response to an explosion in the drift No. 2 in the location being monitored by the switch $ES_4$.

As shown schematically in FIG. 14, the switch $ES_4$ includes spring-loaded pressure valves 420 connected by a fluid conduit 422. A multi-directional air-current valve 424 is pivotally suspended in the drift No. 2 between the valves 420. Actuating links 426 are positioned for engagement with the valve 424 when an explosion in the drift No. 2 moves the valve. In operation the valves 420 are normally closed, and maintain the fluid continuity of the line $FL_4$ through the conduit 422. When an explosive force occurs within drift No. 2, the valve 424 will activate one of the links 426 and open the associated valve 420. The line $FL_4$ is thereby vented to ambient pressure, and the horn $H_4$ will be energized to signal the emergency condition.

The zone No. 4 system also functions to monitor the ambient air quality within drift No. 2 by means of a smoke detection unit SM4. As detailed below with respect to FIGS. 21 and 22, the smoke detection unit SM4 can be mounted on one or more of the unions $U_4$, and is designed to energize the zone system by activating the associated union $U_4$ when a selected level of smoke or the like is detected by the unit $SM_4$.

As shown in FIG. 14, the zone No. 5 system is adapted to detect temperature changes and to activate a secondary fire suppression system 420 whenever a fire hazard is detected within mine drift No. 3. The heat or fire detection is accomplished by the plurality of melt unions $U_5$, such as shown in FIGS. 11 and 12, spaced along the fluid line $FL_5$. The fire suppression system 430 is interfaced with the line $FL_5$ by means of the suppression valve $SV_5$ (see FIGS. 19 and 20). A signal horn $H_5$ is coupled by the valve 418 to the parallel horn line $HL_5$ and the fluid line $FL_5$.

The suppression system 430 includes a suppression line 432 extended within the zone. Discharge heads 434 are spaced along the line 432 for discharging the fire suppressant throughout the zone to be protected. The suppressant is stored within the zone in a canister 436 connected to the valve $SV_5$. As discussed in further detail in reference to FIGS. 19 and 20, the preferred form of suppressant is a gas such as sold under the trademark "Halon" by DuPont & Co., which operates to inhibit combustion while the atmosphere to support life for prolonged periods. Since "Halon" is stored under high pressures, such as a pressure of 350 psi, the canister 436 is designed to withstand high pressures, and the valves $SV_5$ is a high-gain valve when "Halon" is used in the system 430. The valve $SV_5$ interfaces the system 430 with the fluid line $FL_5$ so that the existance of the normal 15-30 psi pressure in the line balances the high pressure of the "Halon" in the canister 436, to hold the valve $SV_5$ normally closed. When the pressure in the line $FL_5$ changes to ambient pressure in response to the sensing of a selected temperature condition by the unions $U_5$, the relief of the line pressure opens the valve $SV_5$. The "Halon" will then discharge into the zone through the line 432 and the discharge heads 434.

FIG. 15 schematically illustrates a central supervisory station 450 for use with the system 400 shown in FIG. 14. The station 450 is designed to operate on a self-contained power supply, such as a 6 volt storage battery, so that the supervisory function is not affected by an external loss of power. A master switch MS connects the battery to the station. The station 450 also includes a supervisory horn 452 for creating an audible signal when any major portion of the system 400 is mal-functioning. The horn circuit is completed in the station 450, to annunciate a signal, if a low-voltage limit switch LV is closed by a decline in the storage battery voltage, i.e., to 5 volts. The horn circuit is also completed if either the high pressure limit switch HP (FIG. 14) monitoring the pressure in the fluid reservoir 402, or the low pressure limit switch LP (FIG. 14) monitoring the pressure in the manifold 404, senses a selected pressure change. Supervisory lights L are included in the station 450 to also provide a visual warning signal. The station 450 further provides for centralized supervision of each of the zones in the detection system 400. The zone pressure switches $PS_1$-5 shown in FIG. 14 are connected to like pressure limit switches $PS_1$-5 in the circuit of station 450 (FIG. 15). If any of the switches $PS_1$-5 senses a change in the pressure of the associated line $FL_1$-5 to ambient pressure, the circuit is completed to a signal light $L_1$-5 in the station 450. Further, the activation of the switches $PS_1$-5 energizes an associated remote control relay $R_1$-5. The relays $R_1$-5 can be connected to a remote station, such as a fire house or the like to provide a remote signal indicating the activation of one of the zone detection systems included in the system 400.

FIG. 16 illustrates one embodiment of a load shift sensor 460 for use in the system 400, such as indicated by the sensor $LS_3$ in zone 3 (FIG. 14). The sensor 460 is designed to be mounted on a stationary bracket 462 fixed to the structure S, such as a mine ceiling, or a support brace or the like, to be monitored. A hollow base portion 464 of the sensor 460 includes a tubular connector 466 for joining the sensor in fluid communication with the detector fluid line $FL_3$. The base 464 defines a fluid conduit 468 which terminates in a vertical nozzle 470.

As seen in FIG. 16, the nozzle 470 defines an arcuate, concave ball seat 472 for receiving a pressure ball 474 of a selected size and weight. The internal diameter of the nozzle 470 is coordinated with the dimensions and size of the ball 474 so that under normal fluid pressure in the line $FL_3$ the ball 474 balances the fluid pressure in the nozzle 474 and maintains the nozzle closed. If the structure S to which the sensor 460 is connected shifts position, such as during a rock slide or fault shift in a mine, the sensor 460 is also moved, and the ball 474 will be unseated from the nozzle 470. The unseating of the ball 474 opens the fluid line $FL_3$ to ambient pressure and thereby activates the associated zone detection system (e.g., horn $H_3$).

The sensor 460 includes a ball-retaining cage 476 that restricts the movement of the ball 474. The side portions of the nozzle 470 also include a sloping shoulder 473 which assists in capturing the shifted ball 474 in a position as shown in dotted lines in FIG. 16. After the sensed change in the ambient conditions has passed, the ball 474 can be re-seated on the nozzle seat 472 to close the fluid line $FL_3$.

Figure 17:
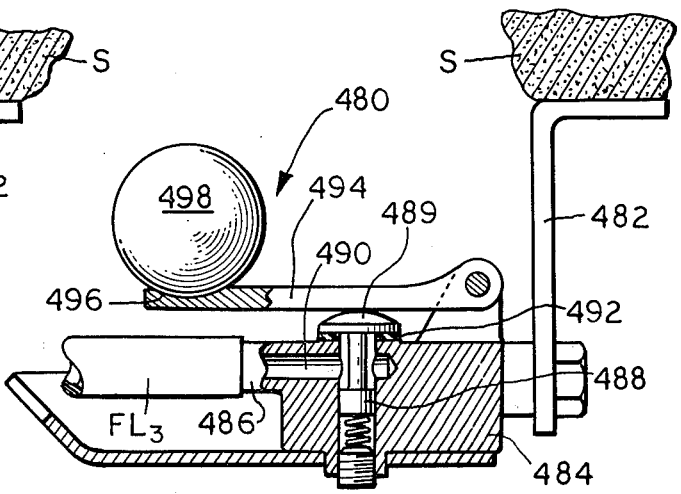

FIG. 17 illustrates a modified load shift sensor 480 for use as the sensor $LS_3$ in a zone detection system. The sensor 480 is also connected to the structure S being monitored by a bracket 482. A base portion 484 includes a connector 486 for joining the sensor to the fluid line $FL_3$, and a spring-loaded poppet valve 488. A conduit 490 connects the fluid line $FL_3$ to the valve 488. A valve head 489 is provided on the outer end of the the valve 488 to close the conduit 490 under normal ambient conditions. A sealing ring 492 assists in maintaining the fluid seal for the valve head 489.

The sensor 480 includes a pivotal lever arm 494 mounted on the base 484 adjacent the valve head 489. Further, the outer end of the lever 494 includes a recess 496 for receiving a balance weight such as the balance ball 498. The length of the lever 494 is coordinated with the weight of the ball 498, the biasing force of the spring-loaded valve 488, and the cross-sectional area of the conduit 490 to maintain the valve 488 closed under normal ambient conditions. When a shift in the support structure S occurs, the balance ball 498 will be displaced, and the valve 488 will open the line $FL_3$ to ambient pressure. The sensor 480 will thereby activate the zone detection system to signal the shift in the structure S.

Figure 18:
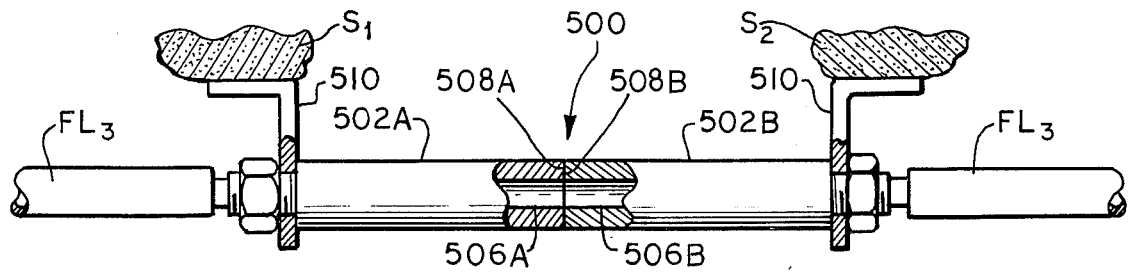

FIG. 18 illustrates a further modification of a load shift sensor 500 which is particularly adopted to sense the relative movement of two support structures S and $S_2$. The sensor 500, for instance, can be installed as the sensor $LS_3$ in the fluid line $FL_3$ shown in FIG. 14, to monitor any dangerous shifting of a mine fault line between structures $S_1$ and $S_2$. The sensor 500 includes two mating sensor members 502A and 502B that are provided with equal bores 506A and 506B. Mounting brackets 510 support the members 502A and 502B on the structures $S_1$ and $S_2$ in a position which normally aligns the bores 506A and 506B. The mating faces 508A and 508B of the members 502A and 502B are machine-polished so that the joint therebetween is fluid-tight. To assure proper alignment and contact between the faces 508A and B, the members 502A and B may be formed from a ferrous material which can be magnetized so that the faces 508A and B have opposite magnetic polarity.

A suitable connection 512 joins the sensor 500 into the fluid line $FL_3$ so that fluid continuity of the line is maintained by the aligned bores 506A and 506B. The bores 506A and B are enlarged to preclude any substantial fluid pressure drop through the sensor 500. This fluid continuity is maintained when the support structure $S_1$ and $S_2$ remain relatively stationary. When a shift occurs between the structures $S_1$ and $S_2$ the brackets 510 move to displace the connected member 502A and 502B and dis-align the bores 506A and B. The displacement of the bores 506A and B thereby break the fluid continuity of the line $FL_3$ and create a signal by changing the line pressure to ambient pressure.

Figure 19:
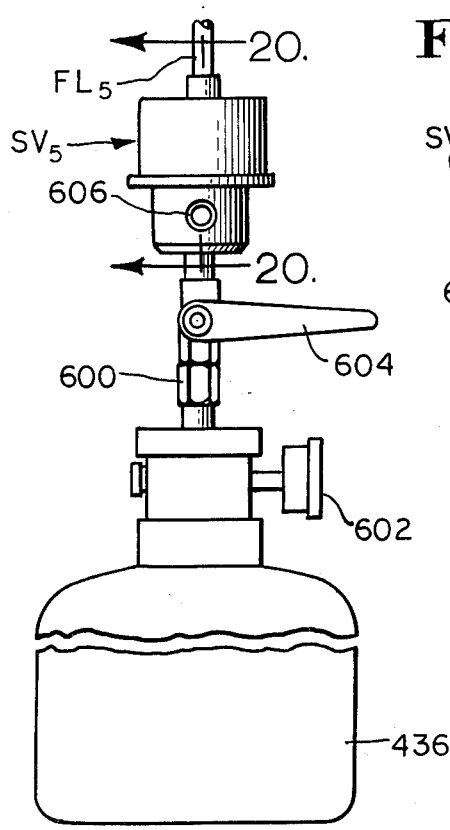
FIG. 19 is an elevational view of a valve system in accordance with this invention for interfacing the detection system with a pressurised secondary response system for discharging pressurized material such as a fire suppressant upon activation of the detection system.
Figure 20:
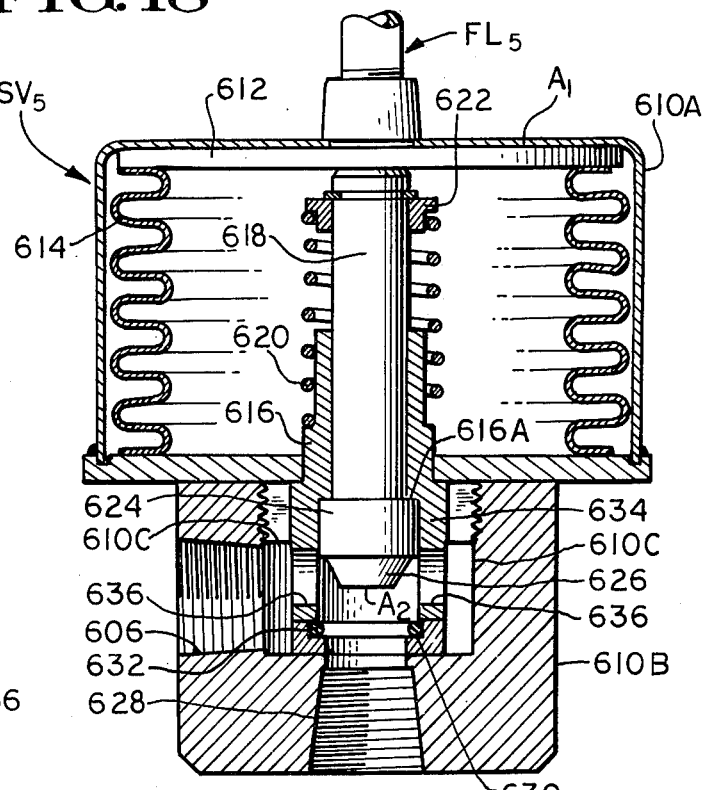
FIG. 20 is an enlarged, cross-sectional view of a pressure valve for use with the interfaced systems shown in FIG. 19.

The structure and operation of the suppressant valve $SV_5$ for interfacing the suppressant system 430 with the detection line $FL_5$ (FIG. 14) are shown in FIGS. 19 and 20. As seen in FIG. 19 the valve $SV_5$ is mounted above the "Halon" canister 436, and is coupled to a branch of the detection line $FL_5$. Suitable tubing 600 joins the valve $SV_5$ to the Halon canister 436. A pressure gauge 602 is provided to monitor the pressure level in the canister, and a manual valve 604 is coupled to the tubing 600 to allow regulation of the suppressant flow if desired. The discharge link 432 (FIG. 14) is coupled to the valve $SV_5$ within the female fitting 606. The high pressure "Halon" in the canister 436 will discharge through the fitting 606 into the fire zone when the valve $SV_5$ is opened by actuation of the detection system and the attendant pressure change in line $FL_5$.

The internal structure of the valve $SV_5$ is illutrated in FIG. 20. The valve includes a dome-shaped pressure housing 610A in direct fluid communication with the line FL5. A movable pressure plate 612 having a substantial selected area $A_1$ is positioned within the dome 610A on spring bellows 614. A boss 616 on the valve supports a plunger rod 618 in a manner which allows the rod to translate within the bellows 614. A coil spring 620 is positioned between the boss 616 and a retainer ring 622 on the rod 618, and urges the rod upwardly in FIG. 20. The lower end of the rod 618 includes an enlarged valve head 624 which defines a circular shoulder for engagement with a stop 616A machined in the boss 616. The stop 616A thereby limits the upward travel of the rod 616. The lower end of the rod 616 defines a bevelled valve 626 having a selected relatively small surface area $A_2$.

The lower end of the valve housing 610B defines the above-described female connection 606 for the discharge line 432. Housing 610B also defined a female connection 628 for joining the valve SV5 to the canister 436. The housing 610B also defines a valve seat 630 for receiving the valve 626 in fluid-tight relationship. A fluid seal 632 engages the tapered valve 626 to assure a fluid seal. The lower end of the boss 616 also defines an annular cage 634 which guides the translating motion of the rod 618. As seen in FIG. 20, the housing 610B also defines an annular recess 610C which receives the cage 634. Uniformly spaced fluid apertures 636 in the cage 634 are provided to distribute the flow of fluid from the canister 436 within the recess 610C before the fluid exits through the connection 606.

The operation of the valve SV5 is apparent from FIGS. 19 and 20. The approximate 30 psi fluid pressure in the line FL5 acts against the enlarged area A1 of the pressure plate 612. The area $A_1$ is established to counterbalance the force of the spring 620 force and the substantial pressure in the canister 436, in the 350 psi range, against the area $A_2$ of the valve 626. Accordingly, when the fluid pressure in line FL5 is maintained, the pressure plate 612 is urged downwardly in FIG. 20 against the spring 620. The bellows 614 is compressed, and the rod 618 is held in its downward position. Under these normal conditions, the valve 626 is engaged in the valve seat 630, and the canister 436 is retained closed.

The change of fluid pressure in the line FL5 to ambient pressure destroys the pressure balance in the valve SV5. The release of the line pressure on area A, releases the rod 618 and allows the high pressure in the canister 436 to unseat the valve 626. The resulting upward motion of the rod 618 is continued until the shoulder on valve head 624 engages the stop 616A. The movement of the rod 618 is assisted by the spring 620. The release of pressure in line FL5 thereby automatically opens valve SV5 and allows the fire suppressing fluid to flow through the connection 606 into the discharge line 432.

FIG. 21 illustrates an additional ambient condition sensing means 700 that can be interfaced with the detection system of this invention to respond to the presence of smoke in one of the zones in one or more of the multi-zone system 400 (see FIG. 14). A typical location for this sensor 700 is illustrated by the smoke detector SM 4 in zone 4 of the system 400 (FIG. 14). The sensor 700 is an ionization-type smoke detection unit which is joined to one of the T-shaped melt unions U4 in the detection system. As set forth above, the union U4 can be constructed as described with respect to the unions 370, 380 or 390 shown in FIGS. 11-13. The sensor 700 generally operates to heat the core C in the associated union U4 and open the fluid line FL4 to ambient pressure by causing the core C ejected, as described above with respect to cores 378, 388 and 398 in FIGS. 11-13.

More specifically, the union core 'C' is formed from a fusible alloy with a selected melting point such as 117° F. The sensor 700 includes a circular heating element 702 encircling the core portion of the union U4. The element 702 is Ni-Chrome wire or the like which will heat rapidly when subjected to an electrical current from a low voltage source (e.g. 6 volts D.C.). The energization of the element 702 is caused by the response of a connected ionization circuit (not shown) to the presence of smoke. A suitable ionization circuit is available under the trademark "SMOKE GARD" Model 730, from Statitrol Corp., Lakewood, Colorado.

The heated element 702 warns the core portion of the union U4 and melts the core C sufficiently to cause the pressure in the line FL4 to eject the core and signal the presence of smoke in the zone of the union. It has been found that the element 702 will heat sufficiently to cause ejection of the core C within about 10-15 seconds after activation of the ionization circuit with this embodiment. The union U4 with the connected element 702 can be reused by refilling the core portion with a new core C.

FIG. 22 shows a modified smoke sensor 700A which has a more rapid response than the sensor 700. In the sensor 700A the heating element 702A is embedded within the material alloy forming the fusable core C. The direct conduction of the heat into the core C reduces the time for response, by ejection of the core C, to about 1-5 seconds after activation of the element 702A by a suitable ionization detection circuit. In both smoke sensor embodiments as shown in FIGS. 21 and 22 the use of the preferred plastic tubing for the fluid line FL4 insulates the unions U4 thermally and electrically from each other, so that the operation of one smoke sensor will not affect other sensors in the fluid line.

Although the invention has been described with a certain degree of particularity, it should be understood that the present disclosure has been made only by way of example. Consequently, numerous changes in the details of construction and the combination and arrangement of components, as well as the possible modes of utilization, will be apparent to those familiar with the art. Such variations in the detection system in accordance with this invention may be resorted to without departing from the spirit and scope of the invention.

What is claimed is:

1. In a fluid detection system including a sealed fluid line having an established absolute fluid line pressure, sensing means in fluid continuity with said line, an independent supply reservoir of fluid under a selected absolute pressure, coupling means joining said reservoir in fluid communication only with said line, and restricting orifice means coupled to said line between said independent reservoir and sensing means producing a first fluid flow rate from said reservoir into said line, the improvement comprising a generally T-shaped temperature-responsible sensing element having a base portion in fluid continuity with the line and having a core portion extending transversely from and in fluid communication with said base portion, and a fusible core emplaced in said core portion to close said element, said core being responsive to a selected temperature change to open said core portion and change said line pressure at a second flow rate greater than said first flow rate, and further wherein the rate of response of said core to said temperature change is variable by varying the length of said core in said core portion.

2. The invention in accordance with claim 1 wherein said core portion of said element is tapered in configuration to retard movement of said core from said core portion and thereby prolong the response time of said element to said temperature change.

3. The invention in accordance with claim 2 said line pressure is a positive gauge pressure and wherein said core portion comprises a hollow frusto-conical member attached to said base portion and converging away from said base portion.

4. The invention in accordance with claim 2 wherein said line pressure is a partial vacuum pressure and said core portion comprises an inverted frusto-conical member attached to said base portion and converging toward said base portion.

5. A static fluid system for detecting a change in ambient conditions comprising:
   a closed elongate fluid line having an absolute fluid line pessure differing from the absolute ambient pressure of the line environment;
   means coupled to said line to maintain said line pressure in said closed fluid line;
   a plurality of means for sensing ambient conditions positioned in said line and adapted to normally maintain the fluid continuity and closed static fluid integrity of said line, at least one of said sensing means being responsive to a first selected change in the ambient conditions of the line environment and at least one other of said condition-sensing means being responsive to a second selected change in said line environment, said sensing means being operative to open said closed fluid line to a fluid flow at an initial flow rate which changes said line pressure to said ambient pressure; one of said sensing means comprising a ventilation monitoring system including a pressure-responsive valve coupled to said line and biased normally closed to maintain the fluid integrity of said line and air-flow detection means coupled with said valve, said air flow detection means being arranged to maintain said valve closed under selected normal air flow conditions in said line environment and further arranged to open said valve and change said line pressure to ambient pressure in response to a selected air flow change;
   means coupled to said line for creating a signal in response to the change of said line pressure to ambient pressure, said signal creating means connected to signal activation means through connecting means separate from said fluid line; and
   means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

6. A static fluid system for detecting a change in ambient conditions comprising:
a closed elongate fluid line having an absolute fluid line pressure differing from the absolute ambient pressure of the line environment;
means coupled to said line to maintain said line pressure in said closed fluid line;
a plurality of means for sensing ambient conditions positioned in said line and adapted to normally maintain the fluid continuity and closed static fluid integrity of said line, at least one of said sensing means being responsive to a first selected change in the ambient conditions of the line environment and at least one other of said condition-sensing means being responsive to a second selected change in said line environment, said sensing means being operative to open said closed fluid line to a fluid at an initial flow rate which changes said line pressure to said ambient pressure; one of said sensing means comprising a fluid level monitoring system including a pressure-responsive valve coupled to said fluid line and biased normally closed to maintain the fluid integrity of said line and a fluid level detection float means coupled to said valve and arranged to move said valve from said closed position to an open position in response to a selected change in fluid level detected by said float means;
means coupled to said line for creating a signal in response to the change of said line pressure to ambient pressure, said signal creating means connected to signal activation means through connecting means separate from said fluid line; and
means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

7. A static fluid system for detecting a change in ambient conditions comprising:
a closed elongate fluid line having an absolute fluid line pressure differing from the absolute ambient pressure of the line environment;
means coupled to said line to maintain said line pressure in said closed fluid line;
a plurality of means for sensing ambient conditions positioned in said line and adapted to normally maintain the fluid continuity and closed static fluid integrity of said line, at least one of said sensing means being responsive to a first selected change in the ambient conditios of the line environment and at least one other of said condition-sensing means being responsive to a second selected change in said line environment, said sensing means being operative to open said closed fluid line to a fluid flow at an initial flow rate which changes said line pressure to said ambient pressure; one of said sensing means comprising a system for detecting the shifting of a selected structure including orifice means coupled to said fluid line; and defining a valve seat; means joining said orifice means to said structure; and a movable valve positioned on said valve seat and maintaiing said orifice normally closed, said valve further arranged to open said orifice in reponse to selected shifting of said structure;
means coupled to said line for creating a signal in response to the change of said line pressure to ambient pressure, said signal creating means connected to signal activation means through connecting means separate from said fluid line; and
means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

8. The system in accordance with claim 7 wherein said valve comprises a movable ball balanced on said valve seat and normally closing said orifice means.

9. The system in accordance with claim 7 wherein said movable valve comprises a poppet valve adapted to close said orifice; means biasing said poppet valve to open said orifice, a valve lever engaged with said poppet valve; and a displaceable weight mounted on said lever and overcoming said biasing means to close said orifice by said poppet valve, whereby shifting of said structure displaces said weight and caused said poppet valve to open said orifice.

10. A static fluid system for detecting a change in ambient conditions comprising:
a closed elongate fluid line having an absolute fluid line pressure differing from the absolute ambient pressure of the line environment;
means coupled to said line to maintain said line pressure in said closed fluid line;
a plurality of means for sensing ambient conditions positioned in said line and adapted to normally maintain the fluid continuity and closed static fluid integrity of said line, at least one of said sensing means being responsive to a first selected change in the ambient conditions of the line environment and at least one other of said condition-sensing means being responsive to a second selected change in said line environment, said sensing means being operative to open said closed fluid line to a fluid flow at an initial flow rate which changes said line pressure to said ambient pressure; one of said sensing means comprising a structure fault-shift detector including first and second shiftable members coupled to said fluid line and each defining a conduit to maintain the fluid continuity of said line; and means joining said members to said structure across a fault therein with said members engaged and said conduits in fluid alignment; whereby movement of said structure along said fault shifts said members and breaks the fluid integrity of said line by disaligning said conduits;
means coupled to said line for creating a signal in response to the change of said line pressure to ambient pressure, said signal creating means connected to signal activation means through connecting means separate from said fluid line; and
means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

11. A static fluid system for detecting a change in ambient conditions comprising:
a closed elongate fluid line having an absolute fluid line pressure differing from the absolute ambient pressure of the line environment;
means coupled to said line to maintain said line pressure in said closed fluid line;
a plurality of means for sensing ambient conditions positioned in said line and adapted to normally maintain the fluid continuity and closed static fluid integrity of said line, at least one of said sensing means being responsive to a first selected change in the ambient conditions of the line environment and at least one other of said condition-sensing means being responsive to a second selected change in said line environment, said sensing means being operative to open said closed fluid line to a fluid flow at an initial flow rate which changes said line pressure to said ambient pressure; one of said sensing means comprising an explosion detection system including a pair of spaced pressure-responsive valves biased into a normally closed position and a movable airflow detector positioned between said valves, said detector being arranged to respond to an explosive increase in air flow to engage and open one of said valves;
means coupled to said line for creating a signal in response to the change of said line pressure to ambient pressure, said signal creating means connected to signal activation means through connecting means separate from said fluid line; and
means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

12. A static fluid system for detecting a change in ambient conditions comprising:
a closed elongate fluid line having an absolute fluid line pressure differing from the absolute ambient pressure of the line environment;
means coupled to said line to maintain said line pressure in said closed fluid line;
a plurality of means for sensing ambient conditions positioned in said line and adapted to normally maintain the fluid continuity and closed static fluid integrity of said line, at least one of said sensing means being responsive to a first selected change in the ambient conditions of the line environment and at least one other of said condition-sensing means being responsive to a second selected change in said line environment, said sensing means being operative to open said closed fluid line to a fluid flow at an initial flow rate which changes said line pressure to said ambient pressure; one of said sensing means comprising a smoke detection system including a melt union included within said fluid line and having a fusible core portion closing said union; a heating element adjacent said core portion; and circuit means connected to said heating element and operative to energize said element in response to the presence of a selected quantity of smoke adjacent said union, with the energization of said element heating said fusible core portion for removal from said union to break the fluid continuity of said line;
means coupled to said line for creating a signal in response to the change of said line pressure to ambient pressure, said signal creating means connected to said activation means through connecting means separate from said fluid line; and
means for restricting fluid flow from said pressure maintaining means to said line both before and after the change of said line pressure, said flow restricting means having an effective flow area such that the fluid flow therethrough is substantially lower than said initial flow rate, said restricting means also being operative to permit fluid flow into said line to compensate for line leakage and to preclude the re-establishment of said line pressure when said line is opened by sensing means.

13. The system in accordance with claim 13 wherein said heating element is embedded within said core portion.

* * * * *